(12) United States Patent
Li et al.

(10) Patent No.: US 10,666,132 B2
(45) Date of Patent: May 26, 2020

(54) ELECTROMAGNETIC INTERFERENCE SUPPRESSION FOR VEHICLE INVERTER

(71) Applicant: Hitachi Automotive Systems, Ltd., Ibaraki (JP)

(72) Inventors: Jia Li, Tarrytown, NY (US); Isao Hoda, Tokyo (JP); Hiroki Funato, Tokyo (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 36 days.

(21) Appl. No.: 15/928,321

(22) Filed: Mar. 22, 2018

(65) Prior Publication Data

US 2019/0296637 A1 Sep. 26, 2019

(51) Int. Cl.
*H02M 1/44* (2007.01)
*H02M 7/00* (2006.01)
*H02P 27/06* (2006.01)
*H02M 7/537* (2006.01)

(52) U.S. Cl.
CPC ............. *H02M 1/44* (2013.01); *H02M 7/003* (2013.01); *H02P 27/06* (2013.01); *H02M 7/537* (2013.01)

(58) Field of Classification Search
CPC ....................................................... H02M 1/44
See application file for complete search history.

(56) References Cited

U.S. PATENT DOCUMENTS

| 6,023,137 A * | 2/2000 | Kumar ................... F01M 5/025 318/400.27 |
| 2015/0171736 A1 | 6/2015 | Takemoto et al. |
| 2016/0183389 A1* | 6/2016 | Toyoda ..................... H02P 6/00 361/753 |
| 2016/0322903 A1* | 11/2016 | Lestician ............ H01F 27/2823 |
| 2018/0259583 A1* | 9/2018 | Jung ..................... H02H 7/0838 |

FOREIGN PATENT DOCUMENTS

| JP | 2015-53770 A | 3/2015 |
| JP | 2017-11836 A | 1/2017 |
| JP | 2017-17881 A | 1/2017 |

* cited by examiner

*Primary Examiner* — Kyle J Moody
*Assistant Examiner* — Trinh Q Dang
(74) *Attorney, Agent, or Firm* — Mattingly & Malur, PC

(57) ABSTRACT

In some examples, an apparatus includes an inverter with a switching circuit. Furthermore, a first circuit has a first circuit ground and a second circuit has a second circuit ground. For example, the second circuit may be electrically connected to the switching circuit, and the second circuit ground may be electrically connected to the first circuit ground. A first capacitor may be electrically connected between the first circuit ground and a main ground. In addition, a second capacitor may be electrically connected between the second circuit ground and the main ground. Additionally, a first impedance of a first conductive path to the main ground may be greater than a second impedance of a second conductive path to the main ground. The first conductive path may include the first circuit ground and the first capacitor, and the second conductive path may include the second circuit ground and the second capacitor.

20 Claims, 7 Drawing Sheets

US 10,666,132 B2

ELECTROMAGNETIC INTERFERENCE SUPPRESSION FOR VEHICLE INVERTER

BACKGROUND

In an automotive inverter-motor drive system, semiconductors in the switching circuit of an inverter may produce rapidly switching voltages and currents. This rapidly switching electrical power may cause undesirable electromagnetic interference (EMI) that may interfere with other onboard electronic devices. To control EMI, electromagnetic compatibility (EMC) requirements may be specified by automotive manufacturers, international standards organizations, and/or government entities. For example, inverters are typically tested to ensure compliance with prescribed EMC standards. In some cases, the EMC standards may regulate the highest noise levels permissible for radiated emission (RE) and conducted emission (CE), as well as the thresholds of input/output (I/O) signals for immunity tests. Nevertheless, conventional efforts at controlling EMI may still be insufficient.

SUMMARY

Some implementations include arrangements and techniques for reducing electromagnetic noise. For example, an apparatus may include an inverter with a switching circuit. Furthermore, a first circuit has a first circuit ground and a second circuit has a second circuit ground. For example, the second circuit may be electrically connected to the switching circuit, and the second circuit ground may be electrically connected to the first circuit ground. A first capacitor may be electrically connected between the first circuit ground and a main ground. In addition, a second capacitor may be electrically connected between the second circuit ground and the main ground. Additionally, a first impedance of a first conductive path to the main ground may be greater than a second impedance of a second conductive path to the main ground. The first conductive path may include the first circuit ground and the first capacitor, and the second conductive path may include the second circuit ground and the second capacitor.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
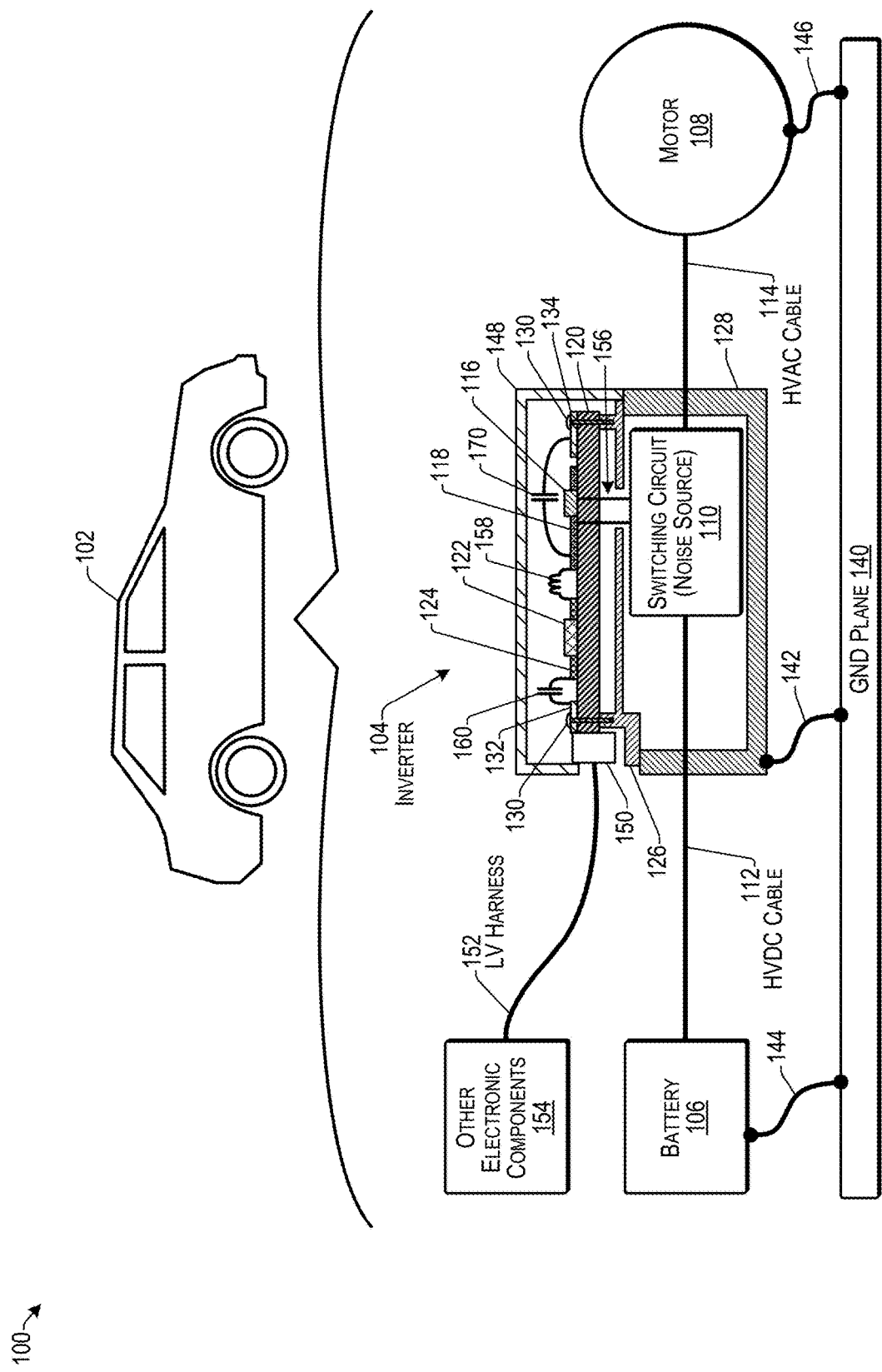
FIG. 1 illustrates an example inverter-motor drive system including reduced EMI according to some implementations herein.

The technology herein includes novel arrangements and techniques for reducing the EMI produced by an inverter. The inverter herein may include a switching circuit, such as an isolated gate bipolar transistor (IGBT) or other switching circuit for converting direct current (DC) to alternating current (AC). The inverter may further include a motor control circuit, an associated motor control circuit ground, a gate drive circuit, and an associated gate drive circuit ground.

A printed circuit board may include the motor control circuit, the motor control circuit ground, the gate drive circuit, and the gate drive circuit ground. An inductor (e.g., chip beads that act as an inductor equivalent) may connect the motor control circuit ground to the gate drive circuit ground. The printed circuit board may be mounted on an inverter housing that contains the switching circuit. The inverter housing may be conductive and/or may include one or more conductive pathways grounded to a main ground and/or ground plane, such as the body of the vehicle, frame of the vehicle, or the like. In some examples, a metallic base plate or other conductor may electrically connect the inverter housing and the main ground (ground plane).

Additionally, the switching circuit in the inverter may be connected to at least two lead wires. A first one of the lead wires may be connected to the gate drive circuit for providing a gate switching signal to the switching circuit and may be connected to a ground circuit. The second lead wire may be used for a gate ground signal and may be connected to the gate drive circuit ground.

At least one first capacitor may connect the MC circuit ground to the inverter housing ground, e.g., as a first inverter housing ground. At least one second capacitor may connect the gate drive circuit ground to the inverter housing ground, e.g., as a second inverter housing ground. The second capacitor may serve to reduce radiated EMI caused by the switching circuit. For instance, by employing the structure and techniques herein radiated emissions (RE), such as electromagnetic noise in the VHF (very high frequency) band (e.g., about 45 MHz to 109 MHz) may be suppressed by an amount sufficient to pass various EMC requirements. Accordingly, implementations herein may effectively suppress RE noise in the VHF band range generated by an inverter-motor drive system by providing a low impedance path between the gate drive circuit ground and the inverter housing ground, thereby diverting a noise current generated by the switching circuit to the ground plane.

In some cases, the second capacitor is sized to have a capacitance that enables the path impedance between the gate drive circuit ground and a second inverter housing ground location to be less than the impedance of a path comprising the gate drive circuit ground, the inductor, the motor control circuit ground, the first capacitor, and a first inverter housing ground location. Accordingly, implementations herein reduce the RE of electromagnetic noise generated by the switching circuit in the VHF band. For example, at least one second capacitor is connected between the gate drive circuit ground and the inverter housing ground. The capacitance of the second capacitor is selected to ensure that the path impedance from gate drive circuit ground to the inverter housing ground is smaller than the alternative path impedance, i.e., the path from the gate drive circuit ground, through the chip beads (e.g., which act as an inductor connecting the gate drive circuit ground to the motor control circuit ground), the motor control circuit ground, and through the one or more first capacitor(s) connecting the motor control circuit ground to the inverter housing ground.

The examples herein provide effective reduction of electromagnetic noise current flowing along the low-voltage signal harness of the vehicle and suppress the RE noise in the VHF band. Further, the examples herein are not limited to the use of a single second capacitor. For instance, one or more resistors may be included with one or more of the second capacitors, such as to dampen any undesirable oscillation that may occur due to the inclusion of the second capacitor(s) in the noise flow path. Additionally, the examples herein are not limited to the use of only one kind or type of capacitor for the second capacitor. For instance, capacitors with different capacitances as well as different types of capacitors may be used in combination (e.g., in parallel or in series) to enhance the noise-current-bypassing performance of the second capacitor(s).

For discussion purposes, some example implementations are described in the environment of EMI noise reduction for an inverter in automotive applications. However, implementations herein are not limited to the particular examples provided, and may be extended to other service environments, other applications, other types of equipment, and so forth, as will be apparent to those of skill in the art in light of the disclosure herein.

FIG. 1 illustrates an example inverter-motor drive system 100 including reduced EMI according to some implementations herein. In this example, a vehicle 102 includes an inverter 104, a battery 106, and a motor 108. For instance, the inverter 104 may include a switching circuit 110 that receives DC power from the battery 106 through a high voltage DC (HVDC) cable 112 and that converts the DC power to AC power that is transmitted through a high-voltage AC (HVAC) cable 114 to the motor 108. Various types of switching circuits may be used; however, as one example, the switching circuit 110 may include a three-phase IGBT circuit that converts the high voltage DC current to an imperfect or modified sine wave, such as a multiple step sinusoidal AC waveform. In other examples, the switching circuit 110 may generate a square wave, a perfect sine wave, or other AC waveform.

Accordingly, implementations herein are not limited to any particular type of AC output for the inverter 104.

The inverter 104 further includes a gate drive circuit 116 and a gate drive circuit ground 118 disposed on a printed circuit board 120, which may include any suitable type of circuit board or support. In addition, the inverter 104 includes a motor control circuit 122 and a motor control circuit ground 124 also disposed on the printed circuit board 120. The printed circuit board 120 is mounted on a base plate 126 that may be metal, conductive, or that is otherwise electrically connected to an inverter housing 128. For example, fasteners 130 in the printed circuit board 120 may connect may electrically connect a first inverter housing ground 132 and a second inverter housing ground 134 to the inverter housing 128 via the base plate 126.

The inverter housing 128 may also be conductive or may otherwise include a conductive path to a ground plane 140, which may correspond to a vehicle main ground such as the vehicle body, vehicle frame, or the like. For instance, the inverter housing 128 may be electrically connected to the ground plane 140 by a grounding connection 142, such as a grounding strap, direct connection, or the like. The battery 106 may be grounded to the ground plane 140 by a grounding connection 144 and the motor 108 may be grounded to the ground plane 140 by a grounding connection 146. In addition, the inverter 104 may include a cover 148 that covers and protects the PCB 120 and the circuits formed thereon.

A signal connector 150 may connect the PCB 120 to a low voltage (LV) harness 152, which may connect to other electronic components 154 in the vehicle 102. For example, the LV harness 152 may serve to interconnect electronic control units (ECUs) (not shown in FIG. 1) to enable communication between the ECUs, as well as connecting to various other vehicle electronics. For instance, a vehicle speed controller (e.g., a foot pedal) (not shown in FIG. 1) may send signals to the motor control circuit 122 through the LV harness 152 and the signal connector 150, such as for controlling the speed of the motor 108, and thereby controlling the speed of the vehicle 102. As one example, a rotation angle sensor resolver may be used to measure the degree of motor rotation and feedback these degree signals via the LV harness 152 to the motor control circuit 122 where the motor speed may be calculated and compared with the driver setting (e.g., pedal position) and control the motor speed accordingly. For instance, if the motor speed is lower than the driver setting, then the motor control circuit 122 may send out a signal to the gate drive circuit 116 to cause a gate signal that causes IGBTs in the switching circuit 110 to open for longer time so that inverter 104 outputs more current to the motor 108 to increase the motor speed.

The inventors herein have determined that in conventional systems, the LV harness 152 may be a significant source of radiated electromagnetic interference (i.e., radiated emissions) in the VHF band range originating in the inverter 104. For example, a noise signal may travel from the switching circuit 110, through one or more gate drive circuit leads 156, through the gate drive circuit ground 118, through an inductor 158 (e.g., PCB beads connecting the gate drive circuit ground 118 to the motor control circuit ground 124), through the motor control circuit ground 124, through the signal connector 150, and into the LV harness 152. The noise signal may be emitted as radiated emissions from the LV harness 152 as EMI that may interfere with the other electronic components 154.

To prevent the electromagnetic noise originating in the switching circuit 110 from affecting the motor control circuit 122, the gate drive circuit ground 118 may be separate from the motor control circuit ground 124. As mentioned above, the gate drive circuit ground 118 may be connected to the motor control circuit ground 124 through as few as one connection, such as through one or more chip beads or other inductor(s) 158 that act as an electromagnetic choke. For instance, an electromagnetic choke is a passive electric component that suppresses high frequency AC current, and may include a coil, a ferrite bead, or the like. Thus, the inductor 158 can reduce some EMI that would otherwise be transmitted from the gate drive circuit ground 118 to the motor control circuit ground 124.

In addition, in some examples, one or more first capacitors 160 may connect the motor control circuit ground 124 to the inverter housing 128, such as at the first inverter housing ground 132. For example, the one or more first capacitors 160 may be connected to the first inverter housing ground 132, and thereby to the ground plane 140, to protect the motor control circuit 122 from electrical static discharge, rather than connecting the motor control circuit ground 124 directly to the first inverter housing ground 132. The one or more first capacitors 160 can tend to increase the RE noise in the VHF band emitted, e.g., by the LV signal harness 152, such as due to an increase in the inductance for the noise signal to travel to the ground plane.

To reduce the RE noise emissions caused by the inverter 104, implementations herein includes at least one second capacitor 170 that connects the gate drive circuit ground 118 to the second inverter housing ground 134. For example, the second capacitor 170 may be sized to enable noise generated by the switching circuit to pass through the capacitor 170, the base plate 126, and the housing 128, into the ground plan 140. In some examples, as discussed below, the second capacitor 170 may have a capacitance between 10 pF and 100 nF. Further, in some examples, the second capacitor 170 may have a capacitance between 100 pF and 10 nF.

In some cases, the capacitance of the second capacitor 170 may be determined based on the capacitance of the one or more first capacitors 160 and the PCB trace inductance of the PCB 120, as well as the PCB trace inductance between the second capacitor 170 and the second inverter housing ground 134. Additional details of determining the capacitance of the second capacitor are discussed below, e.g., with respect to FIG. 3. Thus, the inverter 104 herein may include at least one of the capacitors 170 including a designated capacitance at a defined position to suppress the RE noise in the VHF band.

Figure 2:
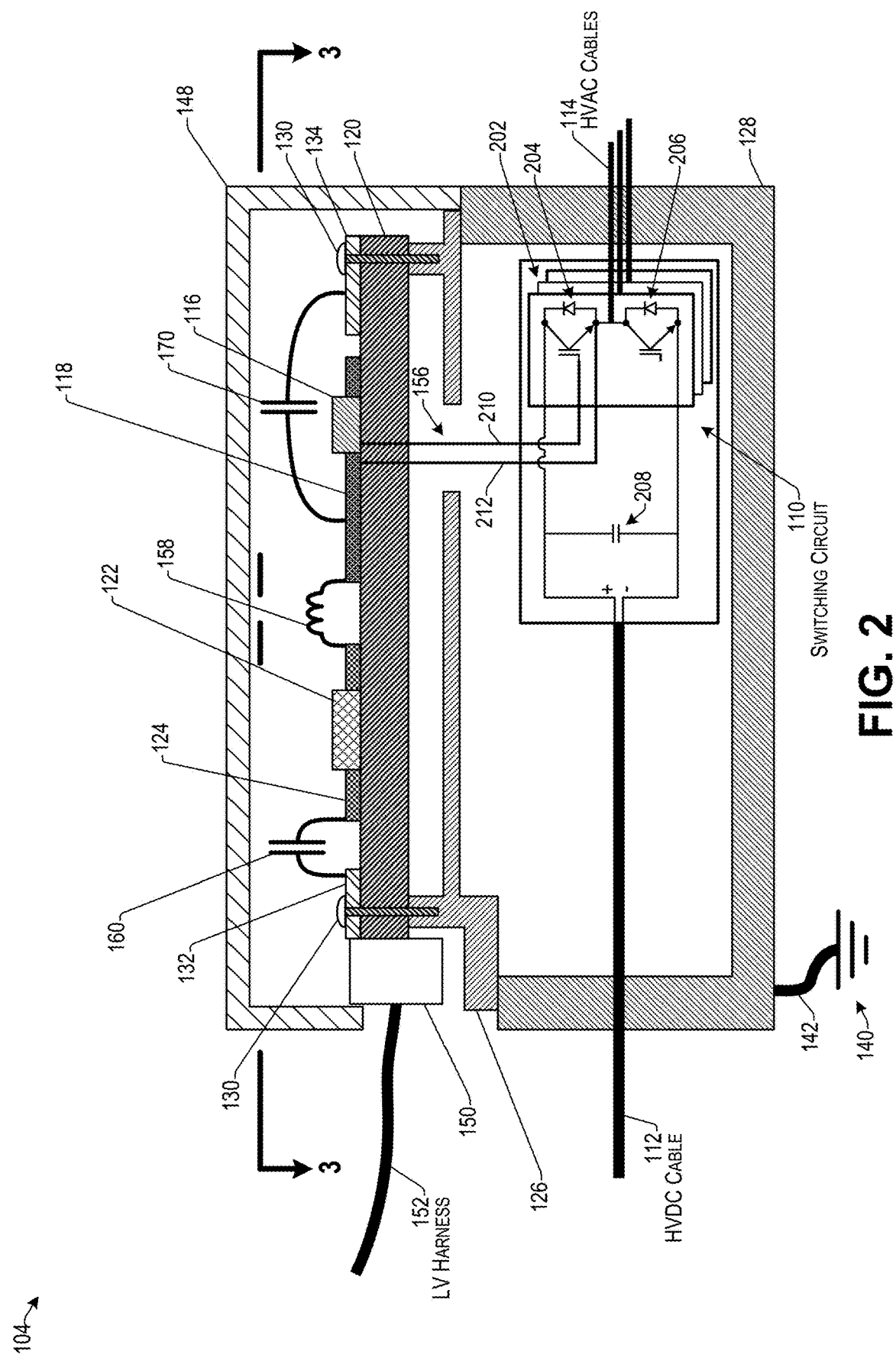
FIG. 2 illustrates an enlarged cross-sectional view of an inverter according to some implementations.

FIG. 2 illustrates an enlarged cross-sectional view of the inverter 104 according to some implementations. In this example, one example of the switching circuit 110 is illustrated as an IGBT 202, which is a semiconductor that allows the control of current/voltage using a small voltage (e.g., 15 volts, etc.) for producing a three-phase AC output from the DC input. Each pair includes a first SCR circuit 204 and a second SCR circuit 206. Further, in some cases a capacitor 208 may be included between a positive line and a negative line. For instance, the capacitor 208 may be a DC link capacitor with a large value, e.g., several hundreds of μF, that may be used to maintain a solid voltage across the switching circuit 110 and help protect the switching circuit 110 from momentary voltage spikes or surges. As mentioned above, at least a pair of leads 156 may connect the gate drive circuit 116 to the switching circuit 110 for driving the IGBT 202. For example, a first lead 210 may be connected to the gate drive circuit for providing a gate signal to a switching circuit of the IGBT 202. In addition, a second lead 212 may conduct a gate ground signal and may be connected to the gate drive circuit ground 118.

The gate drive circuit 116 may include gate drive logic, as is known in the art, for controlling the switching of the IGBT 202 between on and off states. For example, the gate drive circuit 116 may receive a signal from the motor control circuit to cause the gate drive circuit 116 to send a switching signal for controlling the switching of the IGBT 202. As mentioned above, the motor control circuit 122 may receive a motor control signal through the LV harness 152 and signal connector 150 for controlling the speed of the motor and may send a corresponding signal to the gate drive circuit 116. For example, the motor control circuit 122 may receive motor feedback signals such as rotation degrees, motor coil temperature, and inverter feedback signals such as IGBT temperature, output current, and so forth. Based on analysis of these feedback signals, the motor control circuit 122 may send a control signal to the gate drive circuit 116.

In the example of FIG. 2, the inverter housing 128 is grounded at 140 and includes the printed circuit board 120 mounted on a conductive base plate 126 electrically connected to the inverter housing 128. The switching circuit 110 generates noise that may pass into the gate drive circuit ground 118. The gate drive circuit ground 118 is electrically connected to the motor control circuit ground 124 by an inductor 158, such as one or more PCB beads or other electromagnetic choke. At least one first capacitor 160 connects the motor control circuit ground 124 to a first inverter housing ground 132. Furthermore, at least one second capacitor 170 connects the gate drive circuit ground 118 to a second inverter housing ground 134. The second capacitor 170 has a capacitance that enables the path impedance between the gate drive circuit ground 118 and the inverter housing ground 134 to be less than the path impedance between the gate drive circuit ground 118, the inductor 158, the motor control circuit ground 124, the first capacitor 160, and first inverter housing ground 132. Accordingly, the second capacitor 170 provides a lower impedance path from the gate drive circuit ground 118 to the ground plane 140 so that a noise current in the VHF band is bypassed through the inverter housing 128, thereby enabling effective reduction of the noise current flowing along the LV harness 152, and reducing the radiation emission noise in the VHF band emitted by the LV harness 152.

Figure 3:
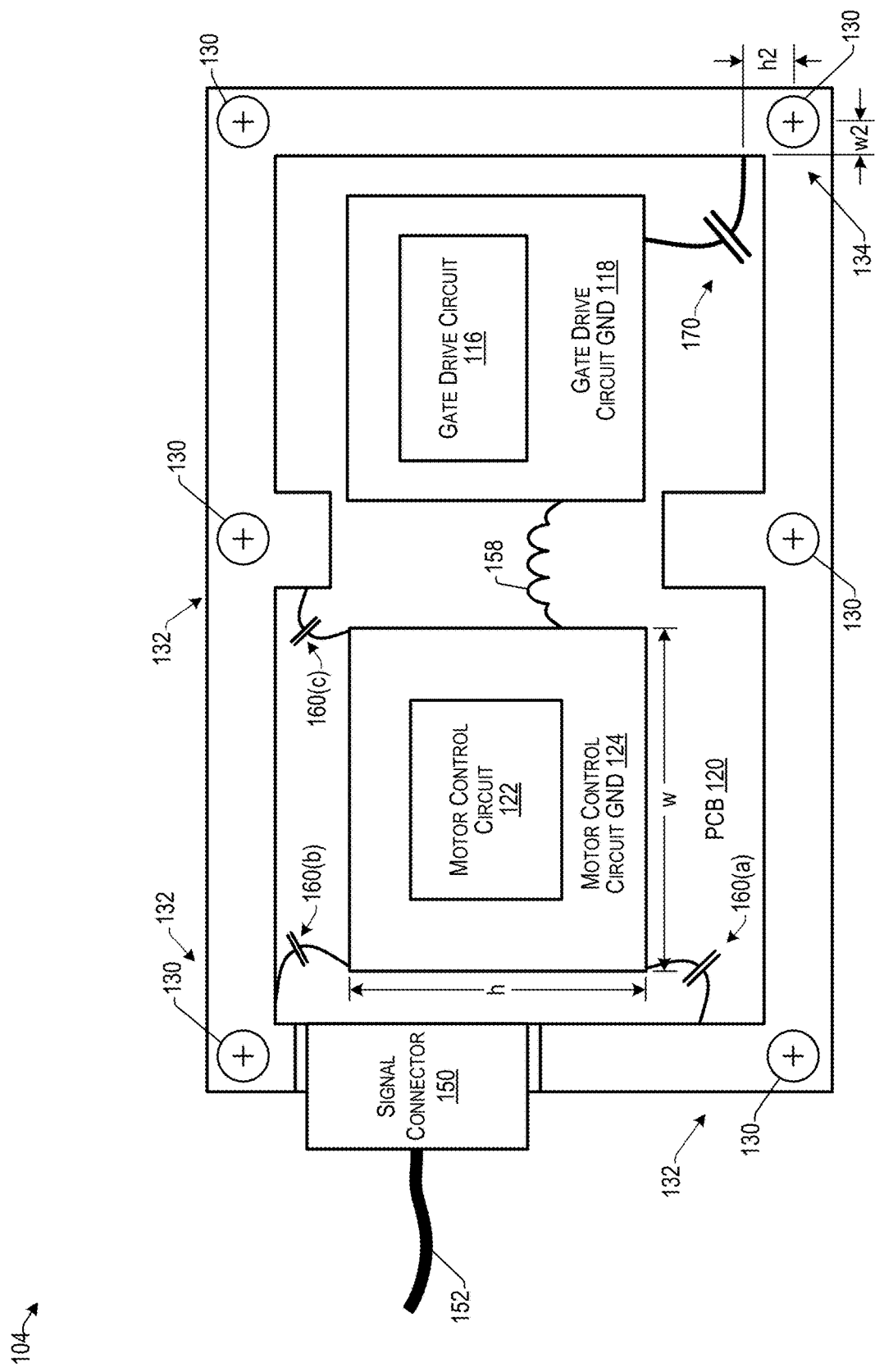
FIG. 3 illustrates a top view of a printed circuit board and an inverter as viewed along line 3-3 of FIG. 2 according to some implementations.

FIG. 3 illustrates a top view of the printed circuit board 120 and the inverter 104 as viewed along line 3-3 of FIG. 2 according to some implementations. In this example, there are three first capacitors 160(a), 160(b), and 160(c) connecting the motor control circuit ground 124 to respective first inverter housing grounds 132(a), 132(b), and 132(c) to reduce the likelihood of electrical static discharge. In addition, the second capacitor 170 connects the gate drive circuit ground 118 to the second inverter housing ground 134.

To determining a capacitance for the second capacitor 170 to enable reduction of electromagnetic noise emissions, as discussed above, the trace inductance L of the printed circuit board (PCB) 120 may first be determined based on the following equation:

$$L = 0.2 \times h \times \left( \log \frac{2 \times h}{w+t} + 0.2235 \times \frac{w+t}{h} + 0.5 \right) \quad \text{EQ (1)}$$

where h is the height in mm of the PCB portion (e.g., the height of the motor control circuit ground 124 as illustrated in FIG. 3), w is the width in mm of the PCB portion (e.g., the width of the motor control circuit ground 124 as illustrated in FIG. 3), and t is the thickness in mm of the PCB traces. For example, in some PCBs, such as a 6-layer PCB, the thickness t may be on the order of 18 μm.

Furthermore, suppose in this example that the capacitance C1 of the first capacitors 160(a), 160(b), and 160(c) is 9 nF each. Additionally, if the first capacitors 160(a)-160(c) have capacitances C1 that differ from each other, the lowest capacitance C1 may be used. Based on EQ(1) above, the trace inductance L1 for the motor control circuit ground 124 may be calculated. In addition, based on EQ(1) above, the trace inductance Lp for the gate drive circuit ground 118 may be calculated. To pass the noise signal through the second capacitor, rather than through the LV harness and the first capacitors 160(a)-160(c), the impedance Z2 of the capacitance C2 of the second capacitor plus the inductance Lp may be controlled to be less than the impedance Z1 of the capacitance C1 of the first capacitor(s) plus the trace inductance L1. The following equation may be used in the VHF band range, e.g., at 67 MHz:

$$Z2 = \left| wLp - \frac{1}{wC2} \right| < Z1 = \left| wL1 - \frac{1}{wC1} \right| \quad \text{EQ (2)}$$

Accordingly, in the example mentioned in which the first capacitance C1=9 nF, and for a typical printed circuit board having an approximate size of the PCB trace for the motor control circuit ground 124 of 16 cm×11 cm×18 µm, and an approximate size of the PCB trace inductance for Lp of 21 mm×3 mm×18 µm, the capacitance value C2 may be larger than 10 pF. In other words, the PCB trace inductance Lp is determined based just on the height h2 and width w2 of the PCB traces between the capacitor 170 and the second inverter housing ground 134.

On the other hand, it would be undesirable for the value C2 to be too large because the second capacitor 170 may be too large to accommodate on the printed circuit board 120. Consequently, based on empirical experience, the capacitance C2 of the second capacitor 170 may be limited to being less than 100 nF. Further, in some examples, the range of capacitance C2 of the second capacitor 170 may be further limited to being in the range of 100 pF to 10 nF, such as to ensure that the total impedance of C2 plus Lp remains sufficiently low for a range of first capacitors 160.

Without the inclusion of the second capacitor 170 herein, the noise current originating in the switching circuit may flow into the gate drive circuit ground 118 and then pass through the inductor 158 (e.g., chip beads or other electromagnetic choke) to enter the motor control circuit ground 124. Noise current may flow through the motor control circuit ground 124 and the first capacitor(s) 160 and signal connector 150, and out via the LV harness 152. For instance, at a high frequency range, this path may have a relatively high impedance and may radiates strongly, e.g., due to a voltage-steering antenna effect.

On the other hand, by including the second capacitor 170, positioned as described above, and by selecting the capacitance C2 of the second capacitor 170 using the above-described technique, the capacitance C2 of the second capacitor 170 is controlled to form a lower impedance path between the gate drive circuit ground 118 and the second inverter housing ground 134. Therefore, instead of flowing through the motor control circuit ground 124, the noise current caused by the switching circuit may be passed to the inverter housing ground 134 based on that path having a lower impedance. Accordingly, implementations herein reduce the noise current flowing along the LV harness 152, and the corresponding RE noise in the VHF band range is also reduced.

Figure 4:
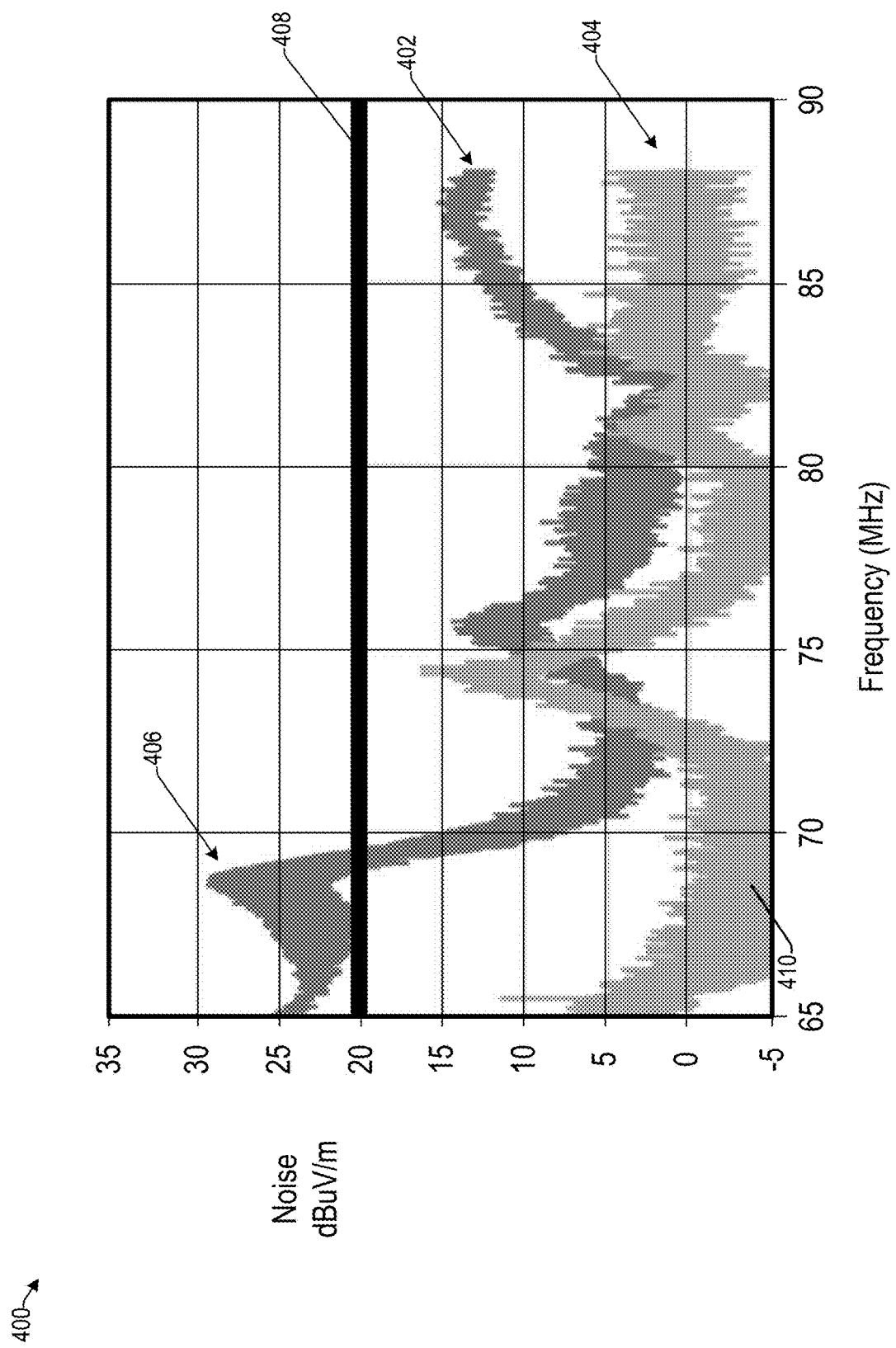
FIG. 4 illustrates a graph showing an example of how the arrangements and techniques herein may improve EMI suppression according to some implementations.

FIG. 4 illustrates a graph 400 showing an example of how the arrangements and techniques herein may improve EMI suppression according to some implementations. In this example, a first plot 402 represents noise without the inclusion of the one or more second capacitors, and a second plot 404 represents noise with the inclusion of the second capacitor as discussed above. As illustrated at 406, without the second capacitor, the noise in the range between 65 and 70 MHz might exceed a prescribed peak limit 408, such as may be prescribed by a vehicle manufacturer, a standards body, or a government entity. On the other hand, as indicated at 410, following addition of the second capacitor, as discussed above, the noise between 65 and 70 MHz may be reduced to being below the prescribed limit 408.

Figure 5:
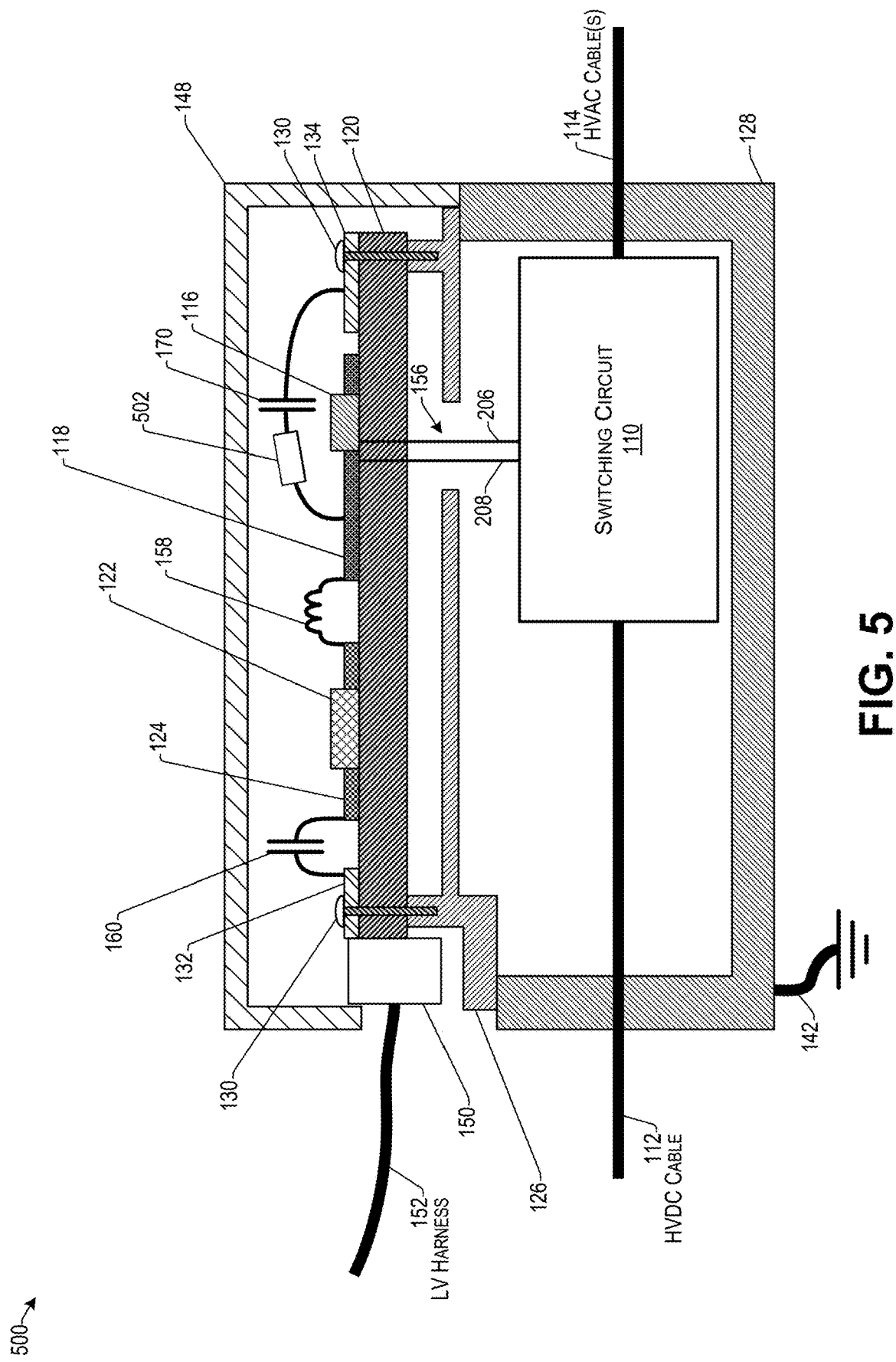
FIG. 5 illustrates an example of an inverter according to some implementations.

FIG. 5 illustrates an example of the inverter 104 according to some implementations. In this example, a resistor 502 is included in series with the second capacitor 170. For instance, the inclusion of the resistor 502 may serve to dampen any undesired oscillation that may occur due to the addition of the second capacitor 170. The resistance of the resistor 502 may be determined and taken into consideration when determining the overall impedance of the second capacitor and the PCB trace inductance Lp. For instance, because the inclusion of the resistor 502 will increase the impedance, the capacitance of the second capacitor may be adjusted accordingly to keep the overall impedance Z2 of the path provided by the second capacitor less than the impedance Z1 discussed above. As an example, the resistance of the resistor 502 may be in a range of 0.1 to 10 ohms, although resistors having smaller or greater resistance may be appropriate in other situations.

Figure 6:
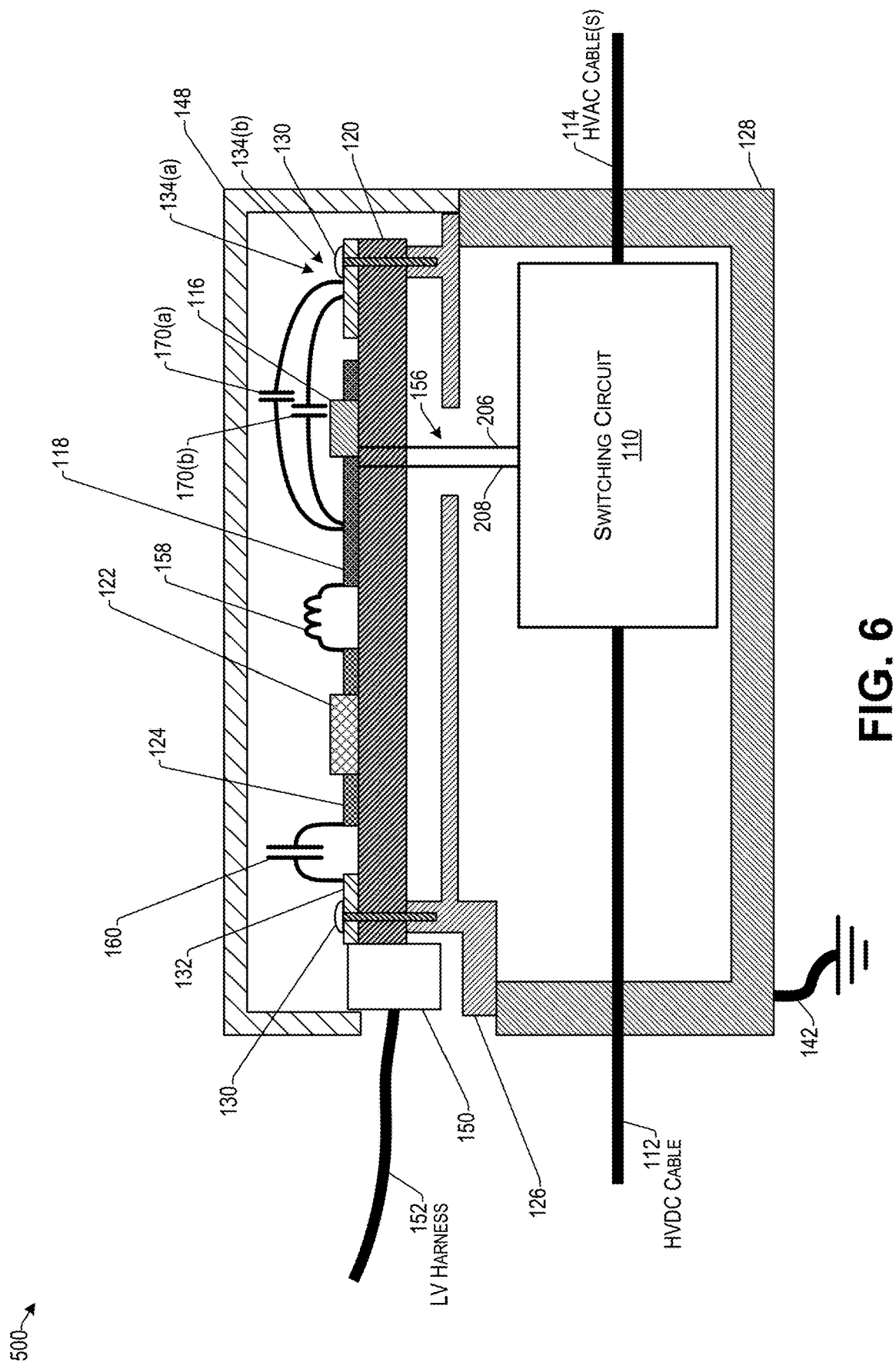
FIG. 6 illustrates an example of an inverter according to some implementations.

FIG. 6 illustrates an example of the inverter 104 according to some implementations. In this example, two second capacitors 170 are connected in parallel to the second inverter housing ground 134. For example, a second capacitor 170(a) may be connected to a second inverter housing ground 134(a), and a second capacitor 170(b) may be connected to a second inverter housing ground 134(b), which may be at the same location or a different location from 134(a). Each capacitor may be sized and selected as discussed above.

In some cases, the capacitor 170(a) may have a larger capacitance than the capacitor 170(b), and both capacitors 170(a) and 170(b) may have a capacitance that is greater than that of the first capacitor 160 so than the impedance of a path through either second capacitor 170(a) or 170(b) is less than the impedance of the path through the first capacitor 160 plus the PCB trace of the motor control circuit ground 124, as discussed above. By having the capacitor 170(a) sized with a different capacitance from the capacitance of the capacitor 170(b), the implementation of FIG. 6 may achieve a wider range of noise reduction, e.g., over a broader frequency range than would be the case if a capacitor of a single capacitance is used.

Furthermore, in other examples, two more second capacitors may be connected in series and sized such that their total capacitance is with the range(s) discussed above. Further, while several example configurations have been illustrated and described herein, numerous other variations will be apparent to those of skill in the art having the benefit of the disclosure herein.

Figure 7:
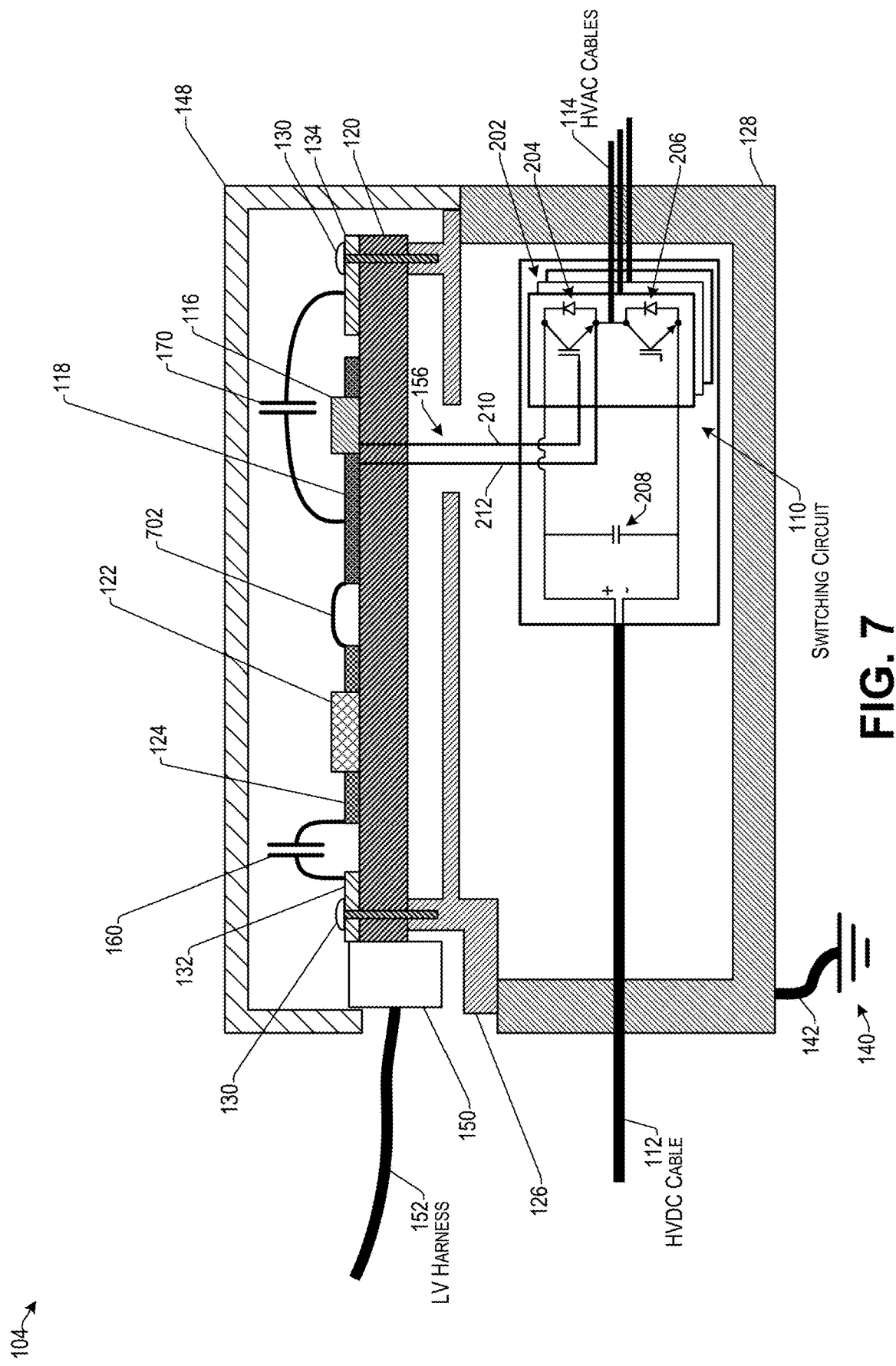
FIG. 7 illustrates an example of an inverter according to some implementations.

FIG. 7 illustrates an example of the inverter 104 according to some implementations. In this example, the inductor 158 (e.g., the inductance equivalence due to PCB beads connecting the gate drive circuit ground 118 and the motor control circuit ground 124) is eliminated between the gate drive circuit ground 118 and the motor control circuit ground 124. Accordingly, the motor control circuit ground 124 may be in direct electrical connection with the gate drive circuit ground 118 on the PCB 120, as indicated by an electrical connection 702 that directly connects the motor control circuit ground 124 and the gate drive circuit ground 118. The inductance represented by the inductor 158 may be similarly eliminated in any of the other examples discussed above with respect to FIGS. 1-6.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:
1. A vehicle system comprising:
an inverter including a switching circuit electrically connected to a battery for receiving direct current to convert the direct current to alternating current for delivery to a motor;

a gate drive circuit electrically connected to the switching circuit to provide a switching signal to the switching circuit, the gate drive circuit electrically connected to a gate drive circuit ground;

a motor control circuit electrically connected to a motor control circuit ground, wherein the gate drive circuit ground is electrically connected to the motor control circuit ground by at least one inductor;

an inverter housing including a conductive pathway to a vehicle ground;

a first capacitor having a first side electrically connected to the motor control circuit ground and a second side electrically connected to the conductive pathway to the vehicle ground; and a second capacitor having a first side electrically connected to the gate drive circuit ground and a second side electrically connected to the conductive pathway to the vehicle ground, wherein a first impedance of a first conductance path through the motor control circuit ground and the first capacitor is greater than a second impedance of a second conductance path through the gate drive circuit ground and the second capacitor, the first and second conductance paths being different.

2. The vehicle system as recited in claim 1, wherein at least a portion of electromagnetic noise generated by the switching circuit is passed through the second capacitor to the vehicle ground.

3. The vehicle system as recited in claim 1, further comprising:

a third capacitor having a first side electrically connected to the gate drive circuit ground and a second side electrically connected to the conductive pathway to the vehicle ground, the third capacitor connected in parallel with the second capacitor, and having a capacitance that is greater than a capacitance of the second capacitor, wherein the first impedance is greater than a third impedance of a third conductance path through the gate drive circuit ground and the third capacitor.

4. The vehicle system as recited in claim 1, further comprising a resistor electrically connected in series with the second capacitor, wherein the first impedance is greater than the second impedance of the second conductive path through the gate drive circuit ground, the resistor and the second capacitor.

5. The vehicle system as recited in claim 1, further comprising a low voltage harness and a signal connector electrically connected to the motor control circuit, wherein:

the motor control circuit is configured to receive a control signal from the low voltage harness and the signal connector and send a switching signal to the gate drive circuit; and the switching circuit includes an insulated gate bipolar transistor that performs switching based on the switching signal received from the gate drive circuit.

6. The vehicle system as recited in claim 2, wherein:

the gate drive circuit, the gate drive circuit ground, the motor control circuit, and the motor control circuit ground are disposed on a circuit board connected to the inverter housing; and the switching circuit is disposed in a space defined by the circuit board and the inverter housing.

7. The vehicle system as recited in claim 6, wherein the at least one inductor electrically connecting the gate drive circuit ground to the motor control circuit ground is configured as an electromagnetic choke to limit electromagnetic noise passing from the gate drive circuit ground to the motor control circuit ground.

8. An apparatus comprising:

an inverter including a switching circuit;

a first circuit having a first circuit ground;

a second circuit having a second circuit ground, the second circuit electrically connected to the switching circuit, the second circuit ground electrically connected to the first circuit ground;

a first capacitor electrically connected between the first circuit ground and a main ground; and a second capacitor having a first side electrically connected to the second circuit ground and having a second side electrically connected to the main ground, wherein a first impedance of a first conductive path to the main ground is greater than a second impedance of a second conductive path to the main ground, the first conductive path including the first circuit ground and the first capacitor, the second conductive path including the second circuit ground and the second capacitor.

9. The apparatus as recited in claim 8, wherein the second circuit ground is electrically connected to the first circuit ground by an inductor that limits transmission of electromagnetic noise from the second circuit ground to the first circuit ground.

10. The apparatus as recited in claim 8, wherein:

the inverter includes a conductive inverter housing electrically connected to the main ground;

the first capacitor is electrically connected to a first side of the conductive inverter housing; and the second side of the second capacitor is electrically connected to a second side of the conductive inverter housing which is opposite to the first side.

11. The apparatus as recited in claim 8, further comprising:

a third capacitor electrically connected in parallel with the second capacitor between the second circuit ground and the main ground, the third capacitor having a capacitance that is greater than a capacitance of the second capacitor, wherein the first impedance is greater than a third impedance of a third conductance path including the second circuit ground and the third capacitor.

12. The apparatus as recited in claim 8, further comprising a resistor electrically connected in series with the second capacitor between the second circuit ground and the main ground.

13. The apparatus as recited in claim 8, wherein:

the switching circuit includes an insulated gate bipolar transistor;

the first circuit includes a motor control circuit configured to control the second circuit; and the second circuit includes a gate drive circuit configured to control the switching circuit.

14. The apparatus as recited in claim 10, further comprising a circuit board disposed on the conductive inverter housing, wherein:

the first circuit, the first circuit ground, the second circuit, and the second circuit ground are disposed on the circuit board;

the first impedance of first conductive path to the main ground includes at least a portion of the circuit board containing the first circuit ground; and the switching circuit is disposed in a space defined by the circuit board and the conductive inverter housing.

15. The apparatus as recited in claim 14, further comprising a conductive plate, wherein:
- the circuit board is disposed on a conductive plate and the conductive plate is disposed on the conductive inverter housing to provide a portion of the conductive path to the main ground;
- the main ground is at least one of a vehicle frame or a vehicle body; and
- a low voltage harness is connected to the circuit board on a first side of the conductive plate and is connected to second capacitor on a second side of the conductive plate opposite to the first side.

16. An inverter comprising:
- a switching circuit for converting direct current to alternating current;
- a first circuit having a first circuit ground;
- a second circuit having a second circuit ground, the second circuit electrically connected to the switching circuit, the second circuit ground electrically connected to the first circuit ground;
- a conductive housing electrically connected to a ground plane and the switching circuit is disposed in a space defined by the conductive housing;
- a first capacitor electrically connected between the first circuit ground and the conductive housing; and
- a second capacitor having a first side electrically connected to the second circuit ground and having a second side electrically connected to the conductive housing, wherein a first impedance of first conductive path to the conductive housing is greater than a second impedance of a second conductive path to the conductive housing, the first conductive path including the first circuit ground and the first capacitor, the second conductive path including the second circuit ground and the second capacitor.

17. The inverter as recited in claim 16, wherein the second circuit ground is electrically connected to the first circuit ground by an inductor that limits transmission of electromagnetic noise from the second circuit ground to the first circuit ground.

18. The inverter as recited in claim 16, wherein:
- the first capacitor is electrically connected to a first side of the conductive housing; and
- the second side of the second capacitor is electrically connected to a second side of the conductive housing.

19. The inverter as recited in claim 18, further comprising a third capacitor electrically connected in parallel with the second capacitor between the gate drive circuit ground and the conductive housing, the third capacitor having a capacitance that is greater than a capacitance of the second capacitor.

20. The inverter as recited in claim 18, further comprising a resistor electrically connected in series with the second capacitor between the second circuit ground and the conductive housing.

* * * * *